July 14, 1931.  A. KÉGRESSE  1,814,046
ENDLESS TRACK BELT
Filed Feb. 3, 1928  3 Sheets-Sheet 1
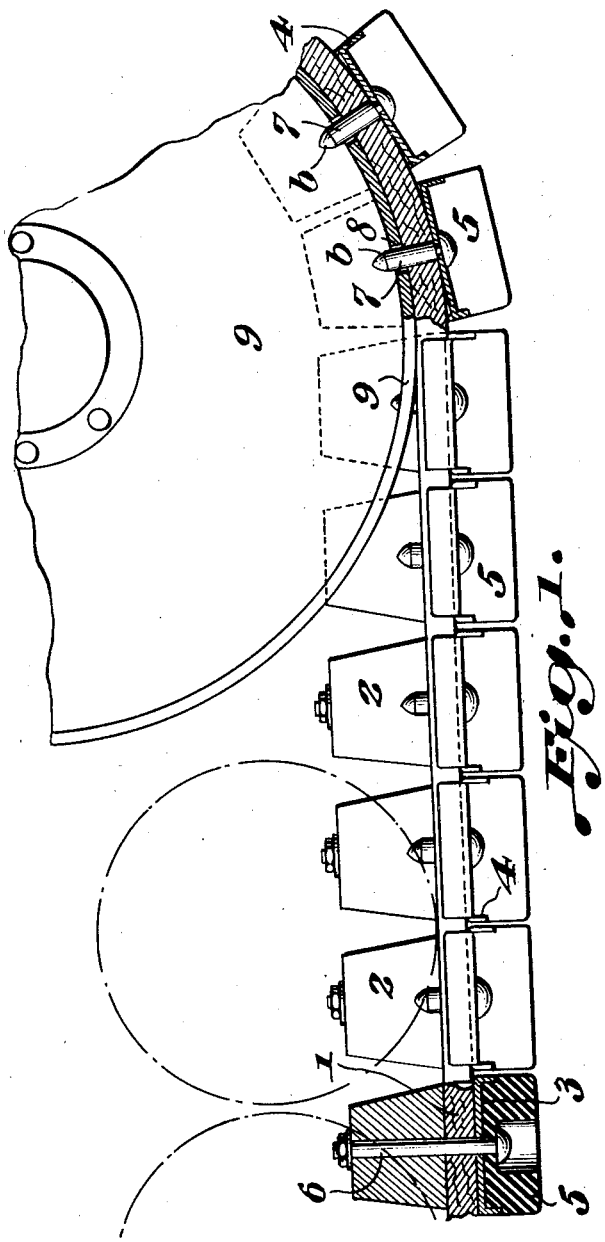
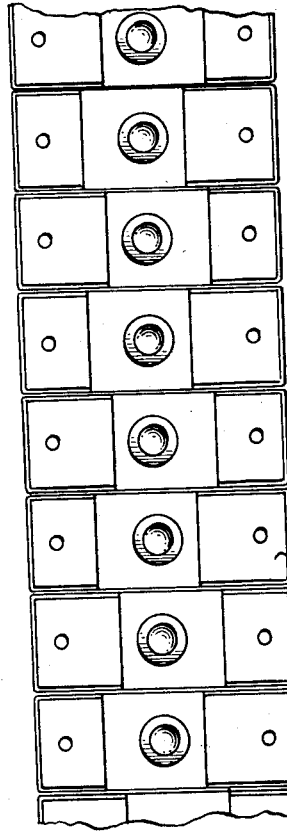
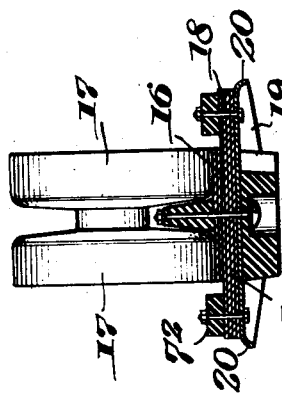
Inventor:
Adolphe Kégresse,
By Emil Bonnelyche
Atty.

July 14, 1931.  A. KÉGRESSE  1,814,046
ENDLESS TRACK BELT
Filed Feb. 3, 1928  3 Sheets-Sheet 2
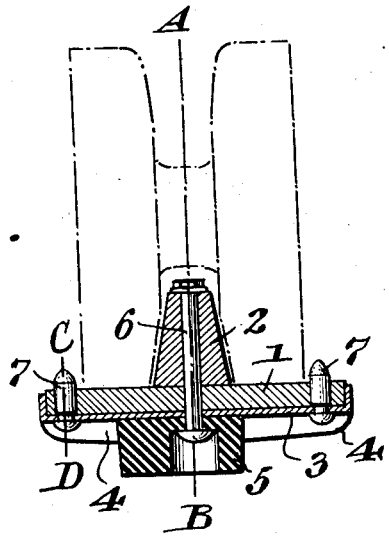
Fig. 2.
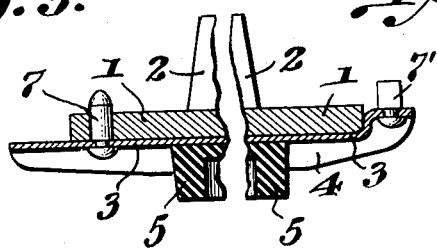
Fig. 3.  Fig. 4.
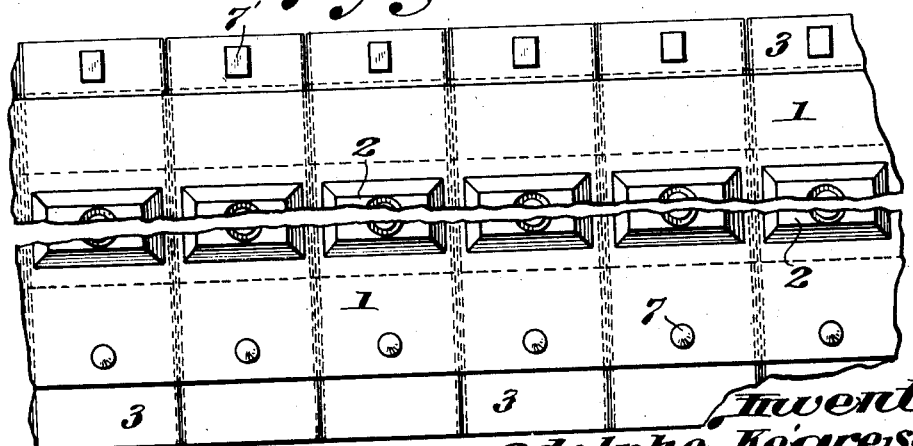
Fig. 6.
Fig. 7.
Inventor,
Adolphe Kégresse,
By Emil Bönnelycke
Atty.

July 14, 1931.  A. KÉGRESSE  1,814,046
ENDLESS TRACK BELT
Filed Feb. 3, 1928   3 Sheets-Sheet 3

Inventor;
Adolphe Kégresse.
By Emil Bonnelyche
Atty.

Patented July 14, 1931

1,814,046

UNITED STATES PATENT OFFICE

ADOLPHE KÉGRESSE, OF SURESNES, FRANCE

ENDLESS TRACK BELT

Application filed February 3, 1928, Serial No. 251,644, and in France February 9, 1927.

Flexible track belts with removable elements and positive drive are already known. Hitherto-known belts of this kind, however, do not answer the essential condition required to permit high speeds, that is, the necessary continuity and uniformity of the roller tread and of the ground tread. So long as those features are not present, the rollers of the carrier train cannot run so smoothly as is a prime requisite, since the lack of evenness of the treads imparts to said rollers rocking movements and vibrations inconsistent with rapid running.

On the other hand, hitherto-known track belts that are positively driven comprise metal parts of the power-chain kind or else metal gearing of the rack type.

In both cases the driving system serves also to guide the belt.

It is also known that there are inconveniences attaching to pivotal connections in the case of metal belts, and that in order to drive an endless belt by means of toothed gearing, this gearing must offer a suitable section and be of rather reduced side so as to avoid highly obnoxious friction as well as the consequences of always possible elongation. Now, it is a recognized fact that, in order to be efficient over all grounds, the guiding of a flexible belt cannot be satisfactorily effected with toothed gearing of such reduced size as is usual in the driving systems at present in use.

The object of my invention is to provide a flexible track belt which will overcome the foregoing inconveniences; and to that end my improved track belt comprises a ground tread made up of removable elements, as well as a positive drive obtained by means of novel devices, independent of the guiding devices.

In the accompanying drawings:

Figure 1 shows in fragmental side elevation a general view of a track belt constructed according to my invention, with parts in section on lines A—B and C—D of Fig. 2;

Fig. 2 is a transverse section thereof;

Fig. 4 illustrates in half section a modification of Fig. 2;

Fig. 5 illustrates in half section another modification;

Fig. 6 is a fragmental top plan view of Fig. 4;

Fig. 7 is a similar view of Fig. 5;

Fig. 9 is a transverse section thereof;

Fig. 10 is a fragmental bottom plan view of Fig. 8, and

Figure 3:
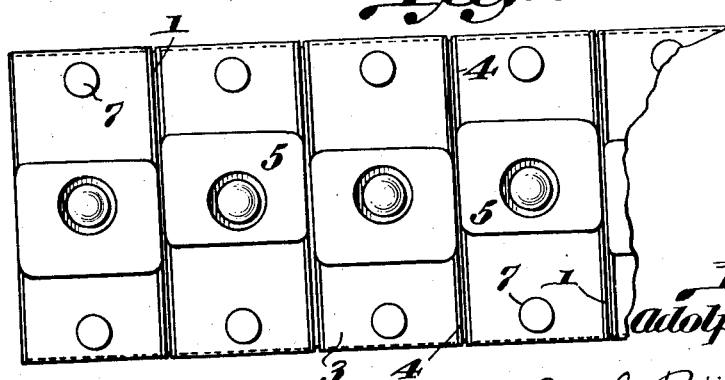
Fig. 3 is a bottom plan view of Fig. 1.

Referring to the construction illustrated in Figs. 1 to 7, the core or body of the belt is constituted by an endless band or element 1 the two faces of which are flat and which is made of suitable flexible material, such as leather, braid, rubberized canvas etc. offering the desired resistance.

On the inner face of said band 1 and in the middle part thereof are mounted along the whole length, blocks 2 serving, in the positively-driven belt, exclusively for guiding purposes.

On the other face of band 1, that is to say on the ground-engaging face thereof, are applied metal plates 3 arranged adjacent to and almost contacting with one another. Said plates carry ribs 4 of different heights which impart the required resistance thereto, said ribs also doing duty as grippers on soft ground.

Elastic shoes 5, made of suitable material, are set in between ribs 4; and it is these shoes which, being arranged almost contacting with one another lengthwise the belt, form the continuous ground tread on hard ground, such as, for instance, roads.

In order to insure better ground grip, the shoes 5 may be arranged in slightly staggered relation (Fig. 3), without such arrangement interfering with the continuity of the tread.

A bolt 6 (Figs. 1 and 2) secures on band 1, guide blocks 2, plates 3 and shoes 5. There is, therefore, on the endless band an equal number of blocks, plates, shoes and assembly bolts.

On each side of the blocks 2 (Figs. 2–7)

I provide a tooth or lug 7 for driving the endless band. These teeth or lugs 7 are secured to the metal plates 3 and run through suitable apertures in the band, as shown at *b*. Teeth 7 and bolt 6 are located along one and the same line parallel to the axes of the carrier rolls and their slightly projecting ends engage in apertures 8 formed in the driving pulley 9 (Fig. 1) so as to insure the positive drive of the system. The teeth may be cylindrical, as shown in Figs. 1, 2, 3 and 5, or rectangular, as indicated at 7' in Figs. 4 and 6.

The modification illustrated in Fig. 5 shows a construction in which the length of plates 3 is greater than the width of band 1. This arrangement permits endless track belts to be made with a very large bearing surface while using flexible belting of comparatively restricted size.

The other modification, illustrated in Fig. 4, is designed according to the same principle as the foregoing one with this difference, however, that the driving teeth 7' are secured on the free ends of the plates 3 which, in this case, are given a suitable shape for that purpose. Of course, teeth 7 might just as well be secured on the free ends of the plates 3 of Fig. 5, outside the belt, without altering at all the nature of my invention.

It becomes apparent, therefore:

1. That the endless band 1 is driven by a system of very short teeth, consequently minimizing friction; the driving teeth being independent of the guiding system which has the size required for efficient performance regardless of the sort of ground over which the vehicle is traveling.

2. That the two teeth or lugs 7 of each plate, passing through the endless band 1, are arranged at opposite sides of the guide block 2 and in a straight line perpendicular to the longitudinal axis of the band—that is to say, parallel to the axes of the rollers of the carrier train—in which line the assembly bolt 6 is also located. Such arrangement maintains complete flexibility of the belt where the latter passes around the pulleys, since the rigid plates 3 are outside and connected with the belt by members situated in a single line parallel to the axes of the supporting and driving pulleys.

3. That the driving action of the teeth 7 is imparted by the latter, in the case shown in Figs. 1, 2, 3 and 5, directly to the endless band 1, without any intermediate member.

4. That the driving of the band is completed by the bolts 6 which connect together all the elements of the track belt, thereby insuring, jointly with the driving teeth 7, a very even distribution of the traction effort over the whole width of the band.

5. That continuity of the trackway for the carrier rollers is insured since the endless band cannot sag between the plates as the carrier rollers run thereover, because of the very close way in which said plates are mounted.

6. That the elastic shoes 5, likewise being mounted in almost-contacting relation, insure the continuity of the ground tread.

7. That all the elements are removable and connected together by means of a single bolt, the driving teeth forming part of or being integral with plates 3 whereon they are permanently secured.

8. That on hard ground, only the narrow elastic shoes 5 bear on the ground, plates 3 serving to support the rollers which run, as it were, clear. Ribs 4 insure the required rigidity and serve as a bearing point in the direction of travel for the bases of the shoes.

9. That the staggered arrangement of the shoes 5 insures a better grip on all kinds of ground without jeopardizing the continuity of the ground tread, since the offsetting in the direction of travel of any one block with respect to its neighbors does not cause a break in the tread, there remaining sufficiently staggering or overlap to insure continuity of the tread.

10. On soft ground, the blocks 5 sink and plates 3 bear upon the ground. Ribs 4 then come into action automatically to do duty as grippers.

11. For track belts with a very large bearing surface, plates 3 may be made longer than the width of the belt (Figs. 4 and 5) and the projecting parts may be made to receive the driving teeth.

All the peculiar features of the belt which forms the subject matter of this invention can be applied just as well to belts with no positive drive. Obviously, in such a case, driving teeth are not used, and the drive may be effected, for example, by means of the guide blocks of prior known types.

Figure 8:
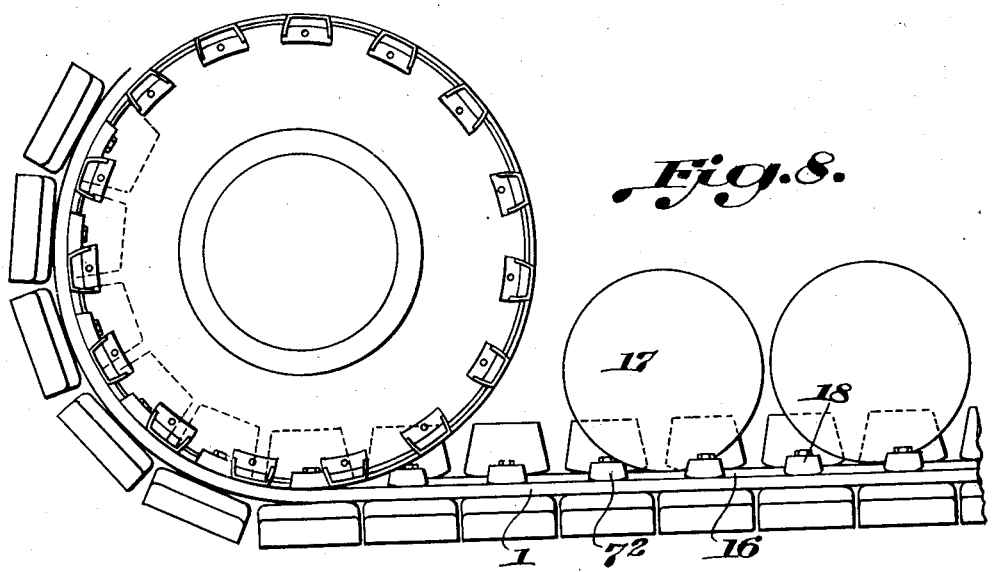
Fig. 8 is a fragmental side elevation of a modified form of belt.
Figure 11:
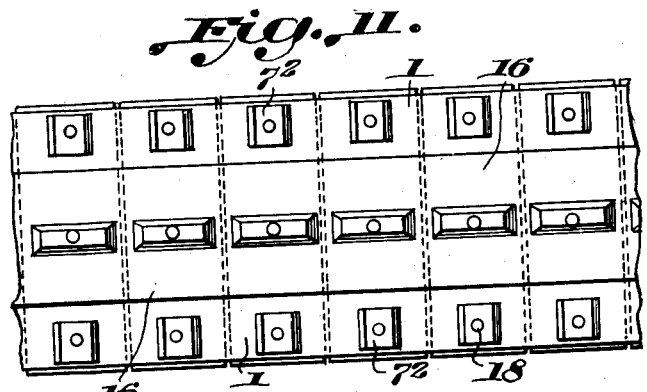
Fig. 11 is a similar top plan view.

Figs. 8–11 illustrates a peculiar construction of the belt itself and its driving device, as well as of the plates that carry the tread blocks; in which construction, 1 denotes the flexible band, which may be made in the same general way as before, or in any other way. On the inner face of the band there is provided an extra thickness 16 serving as a treadway for the rollers which carry the vehicle. This extra thickness, as is most clearly shown in Fig. 9, does not extend over the whole width of the band 1 but is limited approximately to the width of the carrier rollers 17. I thus provide a special treadway or track the ultimate wear and tear of which will not affect the band itself.

The drive is effected as follows:

Here the teeth are constituted by small independent blocks $7^2$, made of any suitable material, such as steel, wood, vulcanized rubber, agglomerate, etc. These blocks are secured on the endless band by means of bolts 18 which pass through said band as well as through the plates 19 (Fig. 9), against which latter the heads or the nuts of the bolts will bear.

It should be noted that, as in the construction in Figs. 1–7, each plate carries two driving members 7², one at each end thereof; and these members or teeth should be suitably shaped so as to give the proper coaction with the driving pulley designed for the purpose.

The plates offer, in the form shown in Figs. 1 and 2, two flanges between which is set the endless band, and the latter, therefore, in that case, is imprisoned crosswise of the plates. In the embodiment shown in Fig. 9, the flanges do not grip the band crosswise; on the contrary, the flanges are rebated outwards at 20—that is to say, on the side opposite the band which, therefore, is released.

I claim as my invention:—

1. An endless track belt comprising an endless flexible band; a series of metal plates secured transversely to the outer surface of the band with their side edges in close relation to one another; and two rows of projecting driving lugs secured to said plates adjacent the opposite side edges of said band.

2. An endless track belt, according to claim 1, in which the two rows of lugs are also engaged directly with the endless band.

3. An endless track belt comprising an endless flexible band; a series of metal plates secured transversely to the outer surface of the band with their side edges in virtual abutting relation; a longitudinal series of guide blocks disposed on the inner surface of said band along its median line; a longitudinal series of elastic shoes disposed against the outer surface of the band directly opposite the guide blocks; and bolts passing through the band, guide blocks, shoes and plates for removably securing them together.

4. An endless track belt, according to claim 3, in which the plates have strengthening ribs on their outer faces between which the elastic shoes are inset.

In testimony whereof I affix my signature.

ADOLPHE KÉGRESSE.